United States Patent [19]

Nagasaka et al.

[11] Patent Number: 4,699,581

[45] Date of Patent: Oct. 13, 1987

[54] MULTI-CYLINDER TYPE INJECTION MOLDING APPARATUS

[75] Inventors: Yasumasa Nagasaka; Akira Takasaki, both of Aichi, Japan

[73] Assignee: Toyota Jidosha Kabushiki Kaisha, Japan

[21] Appl. No.: 815,074

[22] Filed: Dec. 30, 1985

[30] Foreign Application Priority Data

| Jun. 17, 1985 | [JP] | Japan | 60-131461 |
| Jun. 17, 1985 | [JP] | Japan | 60-91091[U] |
| Jun. 17, 1985 | [JP] | Japan | 60-91092[U] |
| Jun. 17, 1985 | [JP] | Japan | 60-131461 |
| Jun. 20, 1985 | [JP] | Japan | 60-134690 |
| Jul. 12, 1985 | [JP] | Japan | 60-153701 |

[51] Int. Cl.$^4$ .................................. B28B 17/00
[52] U.S. Cl. .................................. 425/155; 425/574
[58] Field of Search ............. 425/542, 547, 561, 567, 425/574, 570, 575, 138, 167, 150, 155

[56] References Cited

U.S. PATENT DOCUMENTS 3,647,309  3/1972  Thompson ..................... 425/150
3,887,170  6/1975  Heindl ........................... 425/542

FOREIGN PATENT DOCUMENTS

263300  7/1963  Australia ........................ 425/574
46-33792 10/1971  Japan ............................. 425/574

Primary Examiner—Bernard Nozick
Attorney, Agent, or Firm—Finnegan, Henderson, Farabow, Garret & Dunner

[57] ABSTRACT

A multi-cylinder type injection molding apparatus comprises a shifting table that can be moved toward a fixed head supporting a mold and having a plurality of sprues. The apparatus includes a plurality of injection cylinders mounted on the shifting table that can be moved to a direction orthogonal to the moving direction of the shifting table by a ball screw mechanism, a servo motor, and a numerical control to align the nozzle portions of the injection cylinders with the sprues. The apparatus also includes a mechanism for injecting molten molding material from the injection cylinders into the sprues. In one embodiment of the apparatus, the injecting conditions of each injection cylinder is controlled independently.

16 Claims, 14 Drawing Figures

MULTI-CYLINDER TYPE INJECTION MOLDING APPARATUS

BACKGROUND OF THE INVENTION

1. Field of the Invention

The present invention relates to a multi-cylinder type injection molding apparatus provided with a plurality of injection cylinders movable in accordance with a mold'prue positions.

2. Descriction of the Related Art

In a conventional injection molding apparatus, each mold is provided with one injection cylinder, except where two-color molding or multi-layer molding is desired.

If the molding has a large size or area like a vehicle bumper or an instrument panel, however, the mold must be provided with a plurality of gates opening into the mold cavity so that resin materials can be injected into all portions of the cavity. The gates are connected to the sprue by runners.

In the mold structure available according to the above method, however, as the molding gets larger, the gate-to-gate size gets longer and the runner section in the mold gets larger. As a result, a larger proportion of the injected resin is held in the runner section, and yield is lowered. A further disadvantage of the enlarged runner section is that the passage for resin from the sprue to a gate gets longer and, thus, molding conditions become more unstable.

To improve the yield rate and molding conditions, thermoplastic resin materials typically are injected through a hot runner in the front cavity of the mold and thermosetting resin materials are injected through a cold runner in the front cavity so that moldings can be obtained without causing resin materials to be hardened at the sprue and runner.

Since the mold equipped with the hot runner must incorporate a great number of parts, however, its structure is complicated, and thus, producing such mold requires much time and cost. Moreover, resin often leaks from seams of the parts comprising the hot runner, and material remaining in the hot runner combines with resin subsequently injected during a series of production runs, resulting in uneven or improper resin mixtures.

To address these problems, multi-cylinder type injection molding equipment with a plurality of injection units has been developed to eliminate the hot runner and improve injection molding conditions (see, for example, the specification of the Japanese Utility Model Publication No. Sho 58-180026).

Figure 1:
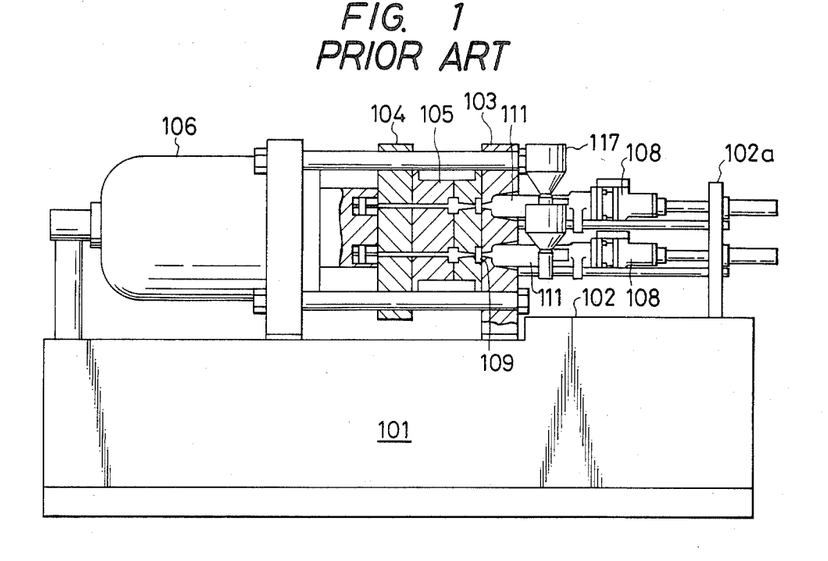
FIG. 1 is a cross-sectional side view of part of a conventional multi-cylinder type injection molding apparatus and mold.

A prior art injection molding apparatus, as shown in FIG. 1, includes on the base frame 102 of the main body 101 two injection units 108 each having a hopper 117 used to supply resin materials, a fixed head 103 and a movable platen 104 used to mount a mold 105 to be charged with molten resin from an injection cylinder 111 of the injection unit 108, and a clamping cylinder 106 used to open and close the mold 105 via the movable platen 104.

The injection units 108 are fixed to a mounting plate 102a on the base frame 102 so that each injection unit is aligned with one of the sprues 109 of the mold 105.

Figure 2:
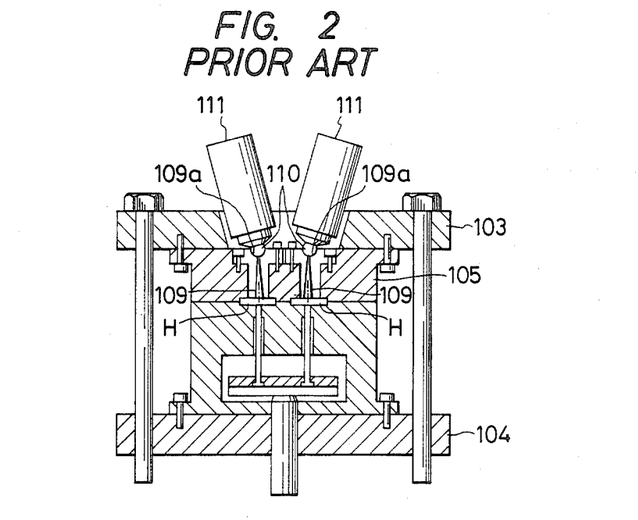
FIG. 2 is a cross-sectional view of the major part of another conventional multi-cylinder type injection molding apparatus and mold.

The prior art apparatus shown in FIG. 2 is provided with tilted injection cylinders 111 having nozzles 110. Nozzles 110 are aligned with sprue apertures 109a of sprues 109 located in the front of mold 105. Sprues 109 are in flow communication with cavities H of mold 105.

By tilting injection cylinder 111, the distances between cavities H provided in the mold 105 can be made to be as narrow as possible and, thus, a small mold can be utilized (see the specification of the Japanese Patent application No. 58-194017).

The above two prior art apparatus have shortened the resin passage by omitting the mold runner without using a gate releasing device such as a hot runner etc. in the mold. However, the sprues are fixed, and the sprue-to-sprue distance is constant and cannot be changed.

Recently, some parts that had been difficult to injection-mold due to their shape, thickness, material, etc., have been made of resin instead of metal. In such injection molding, much emphasis is put on control by injection pressure and rate to optimize dimensional accuracy and mechanical strength. A major factor in a mold design that is intended to eliminate weaknesses at weld lines is the location of the gates.

Determination of the positions of the gates is based on the experience of the mold designer and the know-how accumulated in the mold technique field: the qates and sprues must be set at these proper positions without these positions being affected by the requirements of the injection molding apparatus.

These circumstances require a universal multi-cylinder type injection molding apparatus that has the capability to be used with various molds having different sprue positions.

One object of the present invention is to provide a multi-cylinder type injection molding apparatus that is capable of adjusting the nozzle positions of a plurality of injection cylinders in response to the positions of a plurality of sprues provided in a mold.

Another object of the invention is to provide an apparatus that decreases the defect rate of moldings by permitting the injection molding conditions in the injection units to be set independent of one another.

A further object of the invention is to provide an apparatus that has a shorter pitch between injection cylinder nozzles and can also be applied to a mold with a small sprue-to-sprue interval.

Additional objects and advantages of the present invention will be set forth in part in the description that follows and in part will be obvious from that description or can be learned by practice of the invention. The objects and advantages of the invention can be realized and obtained by the apparatus particularly pointed out in the appended claims.

SUMMARY OF THE INVENTION

The present invention overcomes the problems of the prior art and achieves the objects listed above by providing a multi-cylinder type injection molding apparatus that includes a plurality of injection cylinders, each of which is individually alignable with one of a plurality of sprues connected to a mold.

To overcome the problems of the prior art injection molding apparatus and in accordance with the purpose of the invention, as embodied and broadly described herein, the multi-cylinder type injection molding apparatus of this invention comprises a base frame and a fixed head fixed to the base frame, the fixed head including a plurality of sprues and a front cavity portion capable of supporting a mold, the sprues being in flow communication with a cavity in the mold. The apparatus also includes a shifting table mounted on the base frame and movable toward and away from the fixed head, and means for moving the shifting table forward and away from the fixed head. Furthermore, the apparatus includes a plurality of injection cylinders mounted on the shifting table, each of the injection cylinders having a first end including a nozzle portion and means for supplying a molten molding material to the nozzle portion, the injection cylinders being movable relative to the shifting table. The apparatus also includes positioning means for moving the injection cylinders in a positioning direction orthogonal to the direction of movement of the shifting table and for aligning each of the injection cylinders with an individual one of the sprues, the nozzle portions of the aligned injection cylinders contacting the sprues when the shifting table is moved toward the fixed head.

Broadly, the molding material supplying means of this invention includes a hopper portion connected to each of the injection cylinders and a plunger member rotatably and reciprocably mounted in each of the injection cylinders, the hopper portion being in flow communication with and supplying the molten molding material to the interior of the injection cylinder. Preferably, each of the plunger members includes a spiral groove portion, and the molding material supplying means further includes means for rotating the plunger members to advance the molding material along the spiral groove portions and plunger actuating means for reciprocating the plunger members within the injection cylinders. The positioning means preferably includes control means for detecting the spacial coordinates of the sprues, a ball-and-screw mechanism threadably connected to each of the injection cylinders, and motor means actuated by the control means for rotating the ball-and-screw mechanisms. The rotation of the ball-andscrew mechanisms causes the injection cylinders to move in the positioning direction.

In one preferred embodiment, the apparatus further comprises injection control means for controlling injection timing and injection pressure of each of the injection cylinders independently of one another.

The accompanying drawings, which are incorporated in and which constitute a part of this specification, illustrate one embodiment of the invention and, together with the description, explain the principles of the invention.

DETAILED DESCRIPTION OF THE PREFERRED EMBODIMENT

Reference now will be made in detail to the presently preferred embodiments of the invention, examples of which are illustrated in FIGS. 3 through 14 the accompanying drawings.

Figure 3:
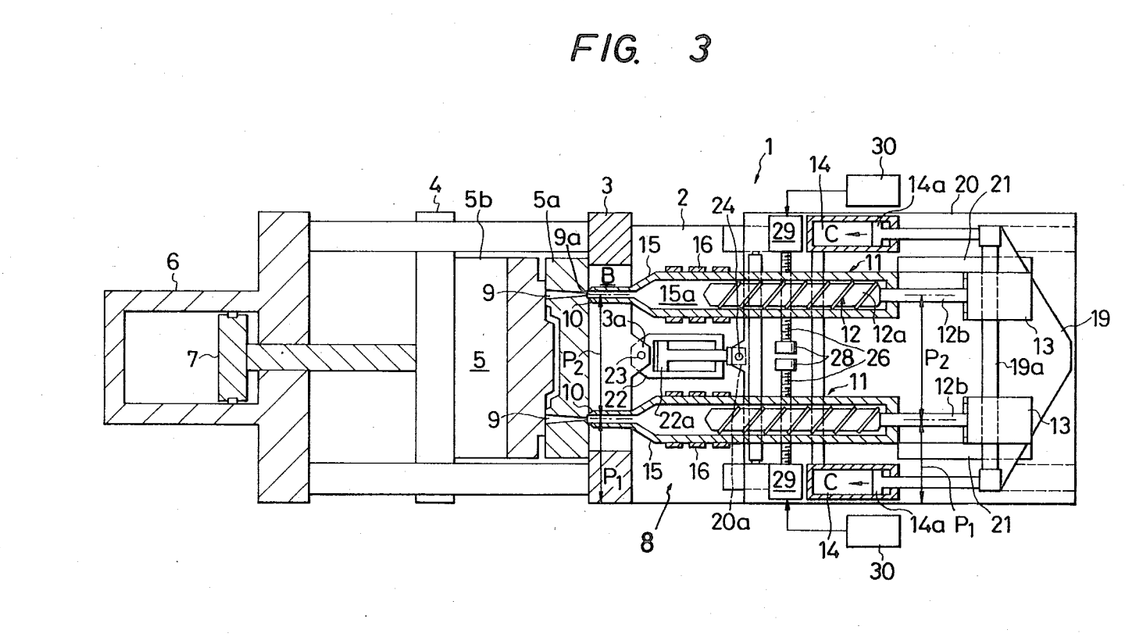
FIG. 3 is a cross-sectional plan view of part of one embodiment of the multi-cylinder type injection molding apparatus of the present invention.
Figure 4:
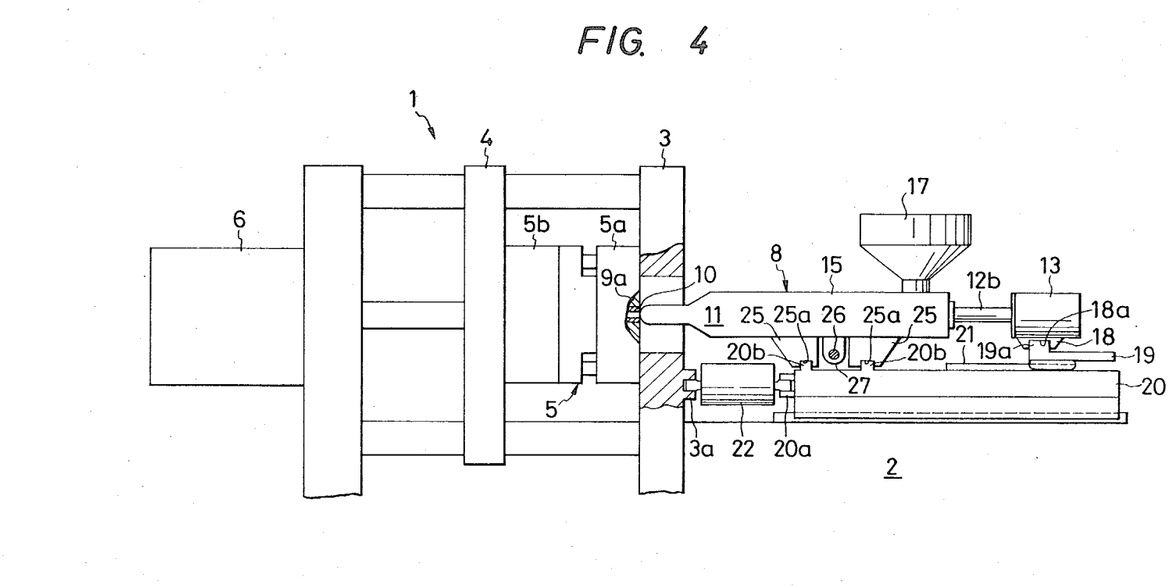
FIG. 4 is a side view in partial cross section of a portion of the apparatus of FIG. 3.

As shown in FIGS. 3 and 4, the injection molding apparatus of the present invention, designated generally by reference numeral 1, is provided with a fixed head 3, which is integral with a base frame 2, and a movable platen 4. The fixed head 3 is equipped with a front cavity 5a, and the movable platen 4 is equipped integrally with a rear cavity 5b to store a mold 5 in the space between the fixed head 3 and the movable platen 4.

A clamping cylinder 6, which hydraulically drives a piston 7, slides the movable platen 4 equipped with the rear cavity 5b longitudinally toward and away from the front cavity 5a for closing and opening the mold.

The apparatus shown in FIGS. 3 and 4 includes an injection unit 8. The injection unit comprises a plurality of injection cylinders 11 (two are shown in FIG. 3) each of which has at its tip a nozzle 10 positioned opposite an aperture 9a of a sprue 9 located in the front of the mold 5, a plurality of hydraulic motors 13 which revolve a screw 12 inside each injection cylinder 11, and a plurality of plunger actuatinq devices 14 which advance and retreat each hydraulic motor 13 integrally with its corresponding screw 12.

In the embodiment of FIGS. 3 and 4, the injection cylinders 11 are arranged along the longitudinal direction, that is, the injecting direction of the apparatus 1.

Each of the injection cylinders 11 is constructed generally of the screw 12 as the plunger which is reciprocated inside the injection cylinder 11, of an outer heating cylinder 15, and of a band heater 16 as a heating medium.

Each injection cylinder 11 also has a hopper 17, which stores resin materials and supplies the resin materials to the injection cylinder in a direction perpendicular to the cylinder axis. Resin materials dropped from the hopper 17 are melted by the heating cylinder and are kneaded along a spiral groove 12a of the screw 12 as the screw 12 is revolved.

Each of the hydraulic motors 13 located at the rear of the injection cylinders 11 is coupled with a rear screw shaft 12b to revolve the screw 12. The hydraulic motor 13, at its bottom, is provided with a bracket 18 having a depression 18a opening downward so that it is orthogonal to the injecting direction.

A rail member 19 equipped with a projected rail 19a is provided on a pair of guide frames 21 fixed on a shifting table 20 so that the rail 19a is mated with the depressions 18a of the bracket 18 and supports the hydraulic motors 13.

The plunger actuating devices 14, which are the drive sources used to reciprocate the screws 12 in the injection cyliners 11 as the plunger, are located at the rear of the outer sides of the heating cylinders 11 and are fixed on the shifting table 20.

Each plunger actuating device 14 includes a piston shaft 14a that extends parallel to the injecting direction. The end of each piston shaft 14a that projects out of the plunger actuating device 14 is coupled with one end of the rail member 19.

The injecting unit 8 is mounted on the shifting table 20, which can be shifted along the injecting direction on the base frame 2. A hydraulic cylinder 22 is provided between the shifting table 20 and the fixed head 3 to permit the shifting table to gain access to the fixed head.

The ends of the hydraulic cylinder 22 are pivoted by pins 23 and 24 to forks 3a and 20a, respectively, which project from the fixed head 3 and the shifting table 20, respectively.

The front upper surface of the shifting table 20 is equipped with two rails 20b each of which is mated with a lower end depression 25a of the bracket 25 mounted on the bottom of each injection cylinder 11 and extends orthogonally to the injecting direction, to guide the sliding of the injection cylinders 11.

A ball screw mechanism 26, a servo motor 29, and a numerical control 30 are provided as the positioning means that permits each injection cylinder 22 to be moved in the direction (laterally in the embodiment shown in FIGS. 3 and 4) orthogonal to that of shifting table movement.

The ball screw mechanism 26 includes a threaded opening on a support 27 fixed to the bottom of each injection cylinder 11 approximately at the center of the injection cylinder 22 in the injecting direction. One end of a male thread of each ball screw mechanisms 26 is supported by a bearing 28, while the other end is combined with the drive shaft of the servo motor 29 fixed on the shifting table 20.

The numerical control 30, when it receives a specified value input, sends a command to the servo motor 29 to drive the latter, revolve the ball screw mechanism 26, and thus move the injection cylinder 11 laterally to a selected position.

Presented below is a description of the operation of the first embodiment of the apparatus of the invention.

After the mold 5 is installed between the fixed head 3 and the movable platen 4, a command is given so that coordinates P1, P2 of the sprue apertures 9a of the mold 5 are read by the numerical control 30, and the injection cylinders 11 are moved to the position of coordinates P1, P2. The servo motors 29 revolve the ball screw mechanisms 26 and move the injection cylinders 22 in a direction orthogonal to the direction of movement of the shifting table. The servo motors 29 are stopped by the numerical control 30 when the center axes of the injection cylinders 11 reach the coordinates P1, P2.

During positioning of the injection cylinders at coordinates P1, P2, the shifting table 20 is pressed backward by the hydraulic cylinder 22, so that the hydraulic piston 22a is positioned at the upper dead point (to the right in FIG. 3).

Upon completion of the above lateral positioning, the shifting table 20 is advanced by the hydraulic piston 22a, putting the nozzle 10 of each injection cylinder 11 in a moving space B inside the fixed head 3 and causing the hydraulic piston 22a to reach the lower dead point (as shown in FIG. 3). When the tip of the nozzle 10 touches the sprue aperture 9a located in the front of the mold 5, positioning for injection molding is completed Next, the hydraulic motors 13 are driven to revolve the screws 12. Resin materials dropped from the hoppers 17, as they are melted and kneaded in the heating cylinders 15, are fed forward toward nozzles 10. The pressure of molten resin fed to the tip of each screw 12 forces the screw to retreat. Screw revolution is stopped by detecting the distance of this retreat. One shot of molten resins is accumulated in a gap 15a in each heating cylinder 15 located at the front end of the screw 12.

By pressing the pistons 14a of the plunger actuating devices 4 in the direction as shown by the arrow C (see FIG. 3), the rail portion 19 connected to the hydraulic motors 13 is moved forward along the guide frames 21. Thus, the screws 12 are advanced as plungers and measured molten resin is injected from the nozzles 10 into the mold 5 through sprues 9.

Presented below is a description of the second embodiment of the present invention. In the following embodiments, descriptions of the components having the same functions as in the above first embodiment will be omitted.

Figure 5:
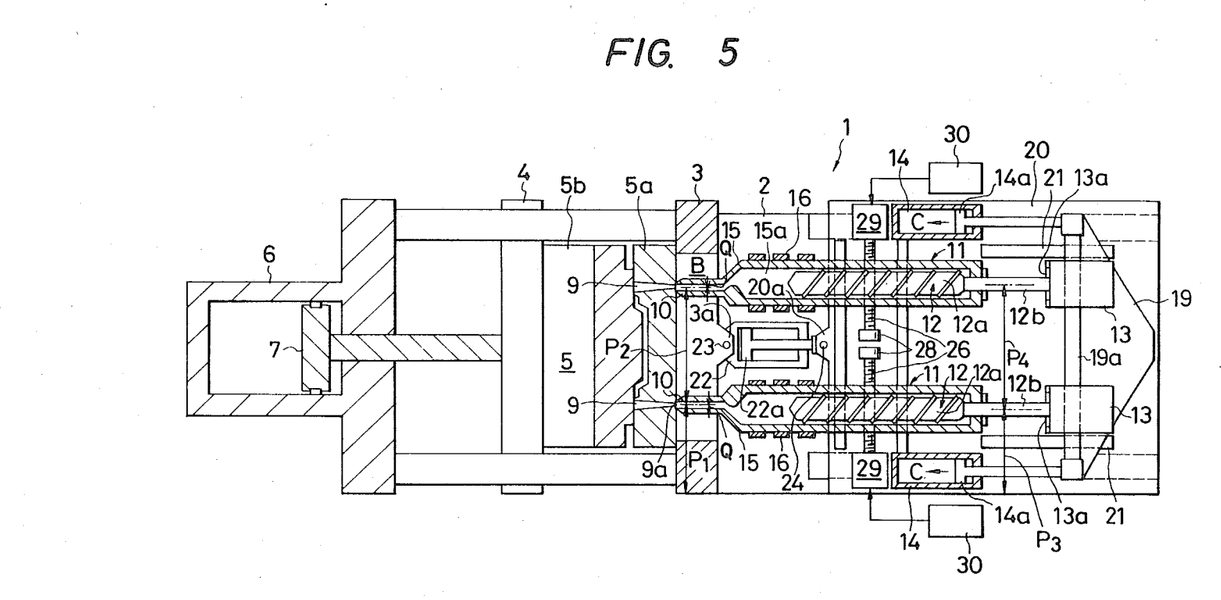
FIG. 5 is a cross-sectional plan view of part of a second embodiment of the multi-cylinder type injection molding apparatus of the present invention.

In the embodiment shown in FIG. 5, each injection cylinder 11 is offset so that the nozzle 10 located at its tip is spaced laterally from its center axis by a given amount Q. When coordinates P1, P2 of the sprue aperture 9a of the mold 5 are read by the numerical control 30 to move the injection cylinders 11 to those coordinates, coordinates P3 (P1−Q), P4 (P2+2Q) are entered into the numerical control 30. The adjacent injection cylinders 11 of the embodiment of FIG. 5 have a smaller nozzle-to-nozzle distance P2 then the distance P4 between their center axes. Hence, it is possible to reduce the nozzle-to-nozzle distance P2 below the outside diameter of the injection cylinder 11. Therefore, the apparatus of the second embodiment can be applied to a mold having a shorter sprue-to-sprue distance than conventional mold.

Presented below is a description of the third embodiment of the present invention.

Figure 6:
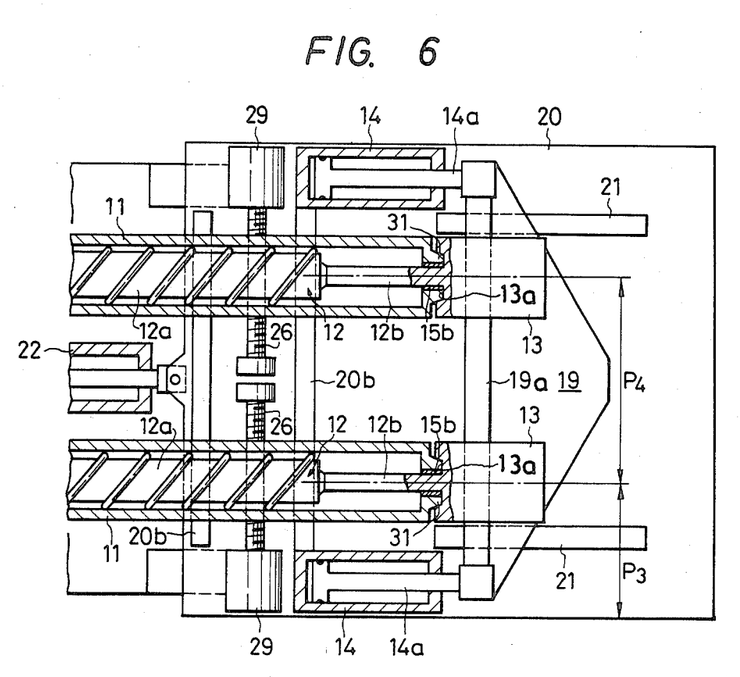
FIG. 6 is a cross sectional plan view of the major part of a third embodiment of the multi-cylinder type injection molding apparatus of the present invention.

The third preferred embodiment uses injection cylinders 11 having the nozzles 10 offset as in the second embodiment. As shown in FIG. 6, the rear end of each injection cylinder 11 is provided with an annular projecting joggle 31 containing an inserting hole 15b for the rear screw shaft 12b.

The front surface of the hydraulic motor 13 facing the rear end of the injection cylinder 11 is provided with a ring-like depression 13a mated with the joggle 31. Thus, the injection cylinder 11 engages with the hydraulic motor 13.

Presented below is the operation of the third preferred embodiment.

The shifting table 20 and the positioning means, including the numerical control 30, the servo motor 29, and the ball-and-screw mechanisms 26, operate on the injection cylinders 11, causing the nozzle tips to touch the sprue apertures 9a. The joggles 31 and the ring-like depressions 13a are mated with one another, during lateral movement of the injection cylinders 11, so that the injection cylinders 11 and the hydraulic motors 13 became integral with each other, improving their rigidity. Thus, the injection cylinders 11 can be moved smoothly, safely, and accurately.

Further, no loads are applied to the screw 12 as the plunger or the rear screw shaft 12b during lateral positioning and fewer scorings are brought about on the sliding surface in the injection cylinder, leading to increased durability of the components.

In the third embodiment, a mating feature by depression and projection or a clutch mechanism by gear engagement can be used to engage the injection cylinder 11 and the hydraulic motor 13 with each other.

Presented below is a description of the fourth preferred embodiment of the present invention.

Figure 7:
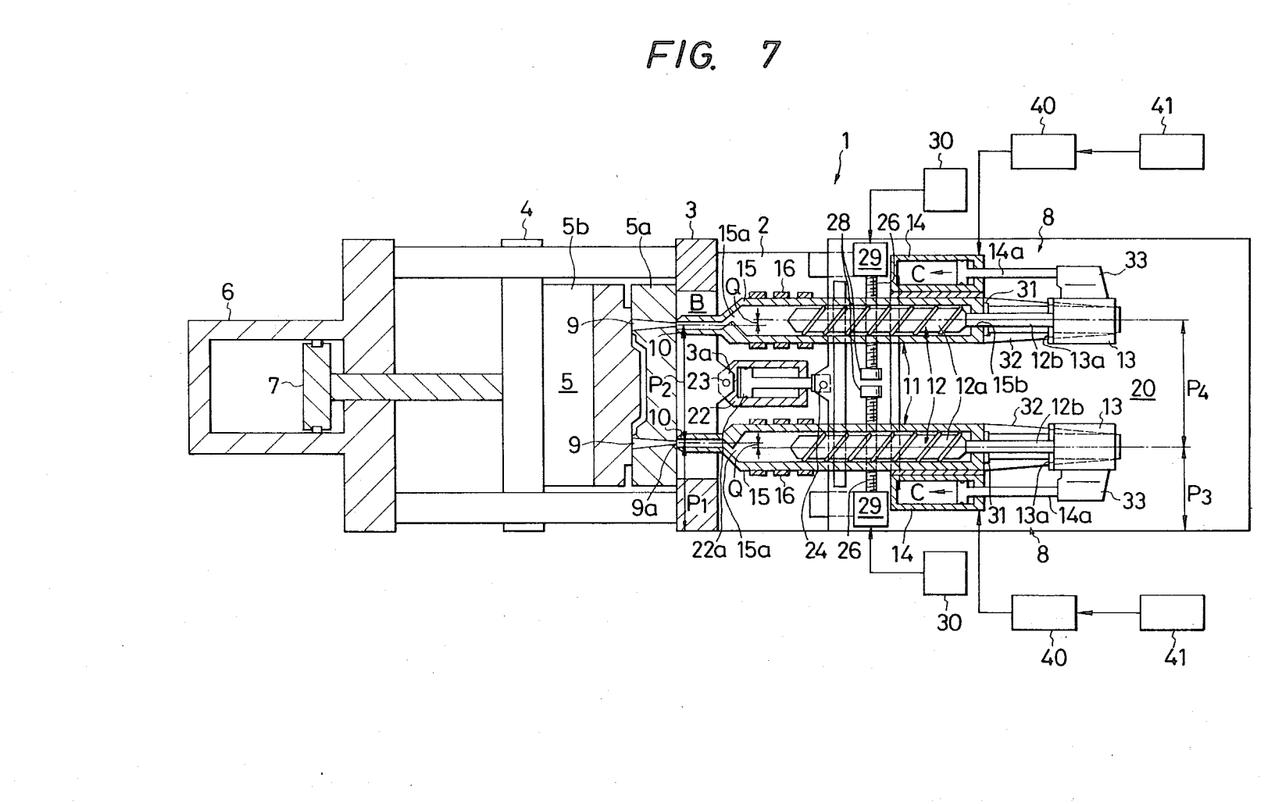
FIG. 7 is a cross-sectional plan view of part of a fourth embodiment of the multi-cylinder type injection molding apparatus of the present invention.
Figure 8:
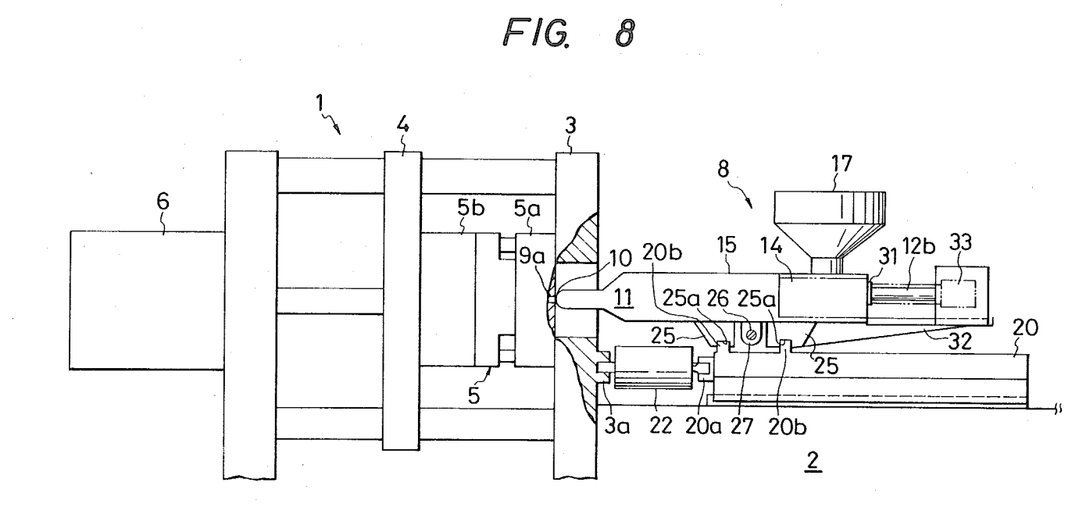
FIG. 8 is a side view in partial cross section of a portion of the apparatus of FIG. 7.

In the fourth preferred embodiment, shown in FIGS. 7 and 8, the nozzle position of each injection cylinder 11 is offset against its center axis, as in the second and third embodiments.

The hydraulic motor 13 is guided on an arm support 32 in place of the rail member 19, and can be moved in the longitudinal direction of the injection cylinder. The arm support 32 is fixed to the bottom portion of the rear end of the injection cylinder 11 and extends backward. Its front end is coupled with the side surface of the bracket 25.

As in the third preferred embodiment, the front surface of the hydraulic motor 13 is equipped with a ring-like depression 13a that is mated with the joggle 31 of the injection cylinder 11 when the latter is moved laterally in the direction orthogonal to the injecting direction.

The plunger actuating device 14 is fixed on the rear portion of the side of the injection cylinder 11 via a fitting portion. The piston shaft 14a of the plunger actuating device 14 is extended in parallel with the injecting direction. Its projecting end is coupled to a coupling portion 33 extending from the side of the hydraulic motor 13.

In the apparatus 1 shown in FIGS. 7 and 8, a desired injection rate, injecting pressure, etc. can be set independent of each other. This is accomplished by controlling injection molding conditions of the individual injection cylinders 11 by injection control means comprising hydraulic pump units 40 and servo control mechanisms 41. Each hydraulic pump unit 40 controls the movement of a plunger actuating device 14, which, in turn, drives its corresponding screw 12 as a plunger.

Presented below is a description of the operation of the fourth embodiment with reference to FIGS. 7, 8, and 11-14.

In the apparatus shown in FIG. 7, when the nozzle 10 of each injection cylinder 11 touches the appropriate sprue position of the mold 5, positioning for injection molding is completed.

The screw 12 is revolved by driving the hydraulic motor 13. Next, resin materials dropped from the hopper 17 are melted and kneaded in the heating cylinder 15 and are moved forward. The screw 12 retreats under the pressure of molten resin fed to the tip of the screw 12. Screw revolution is stopped by detecting its retreat distance, and one shot of molten resin is accumulated in the gap 15a of the injection cylinder 11 located in the front of the screw 12.

The measured amount of resin is injected by pressing the piston 14a of the plunger actuating device 14 in the direction of the arrow C (see FIG. 7). The screw 12 is advanced together with the movable hydraulic motor 13, and molten resin is injected from the nozzle 10 into the mold 5.

Figure 11:
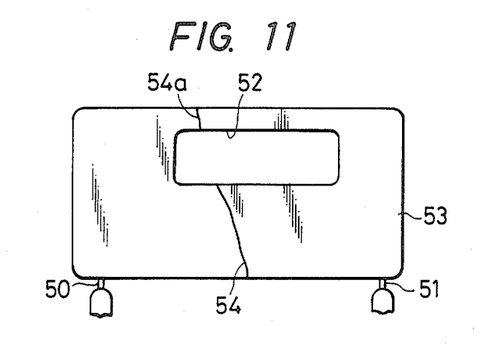
FIGS. 11 and 12 are plan views of moldings for use in a description of weld line control.
Figure 12:
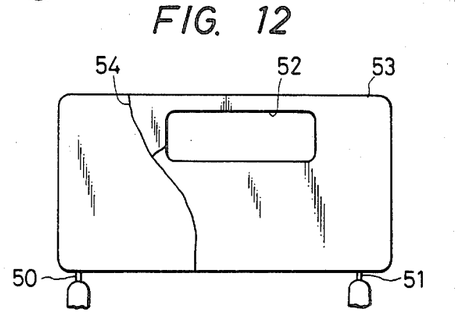

As shown in FIGS. 11 and 12, molten resin is injected from the two gates 50 and 51 into the cavity of the mold 5, and a molding 53 having a rectangular hole 52 is made.

In FIG. 11, the injecting timing of the screw 12 of each injecting cylinder 11 is the same. Hence, a weld line 54, which is formed at almost the center line of the molding 53, traverses the rectangular hole 52, resulting in lowered strength at the position of the weld 54a.

In the apparatus shown in FIGS. 7 and 8, the injecting timing in the injecting cylinders 11 can be changed at the discretion of the operator. As shown in FIG. 12, the position of the weld line 54 can be offset and displaced from the rectangular hole 52 by injecting resin through the gate 51 before commencing injection through the gate 50. Thus, the weld line 54 is not located in any thin portion to cause lowered mechanical strength.

Figure 13:
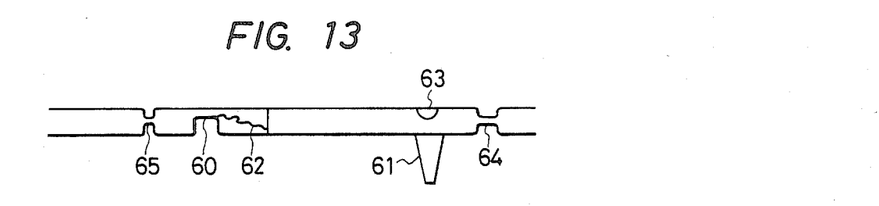
FIGS. 13 and 14 are cross-sectional views of moldings for use in a description of controlling flow marks and sunk spots.
Figure 14:
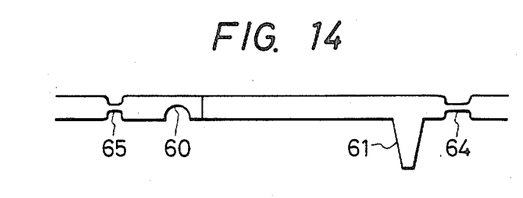

As shown in FIG. 13, in an injection molding apparatus provided with a single injection unit, a flow mark 62 and a sunk spot 63 are likely to result if a bottle neck 60 and a boss 61 are required in moldings. As shown in FIG. 14, however, by controlling the servo control mechanism 41 by injection control means to advance the timing of injection through the gate 64 and decrease the injecting rate in the gate 65, the above two drawbacks can be solved.

Fine measures can be taken against improper molding including burn marks and deformation. Different molding resin materials can also be used.

When using fiber reinforced resin materials, strength can be enhanced without introducing any local thick portion, if the contents of reinforcing fibers injected by the injection cylinders are varied for molding. Thus, the strength of moldings can be increased by the minimum weight amount of resin materials.

Setting injection molding conditions of the injection cylinders independent of one another by the injection control means leads to reduced improper molding in a wide range of molds with different shapes.

The present invention is not limited to the above four embodiments. An electric servo motor, a rack-and-pinion drive mechanism, or a numerical control may be used as the injection control means instead of the hydraulic control system.

In the preferred embodiments of the present invention, the plunger device 14 which reciprocates the screw 12 is installed at the outer rear of the injection cylinder 11; however, the plunger actuating device 14 may be installed in front of or at the rear of the hydraulic motor 13.

In the above preferred embodiments, the structure of the injection molding equipment has been described on the basis of an in-line screw type where the screw makes molding materials plastic and acts as the plunger. The present invention is not limited to such a type; it can also be applied to other types such as a vent type, a screw pre-puller type, a plunger pre-puller type, a plunger type, and high-pressure plastic-implementation types including a dynamic method and a high-pressure plastic-implementation press method.

The injection cylinders may be moved not only in the lateral direction orthogonal to the injecting direction but also in the vertical direction, depending on the position of the ball screw mechanisms.

Further, in the preferred embodiments, the hydraulic cylinder 22 is used to drive the shifting table 20; an electric drive including an electric motor and a ball screw mechanism may also be used for that purpose.

As being obvious in the above descriptions, the present invention provides an injection molding apparatus with a plurality of injection cylinders that can be moved by the positioning means Therefore, the injection nozzle can be set at any mold sprue position through simple operation and without using a complicated feature, which permits the time period for mold replacement to be reduced.

Presented below is a description of the preferred embodiments of a mold used in the present invention.

Figure 9:
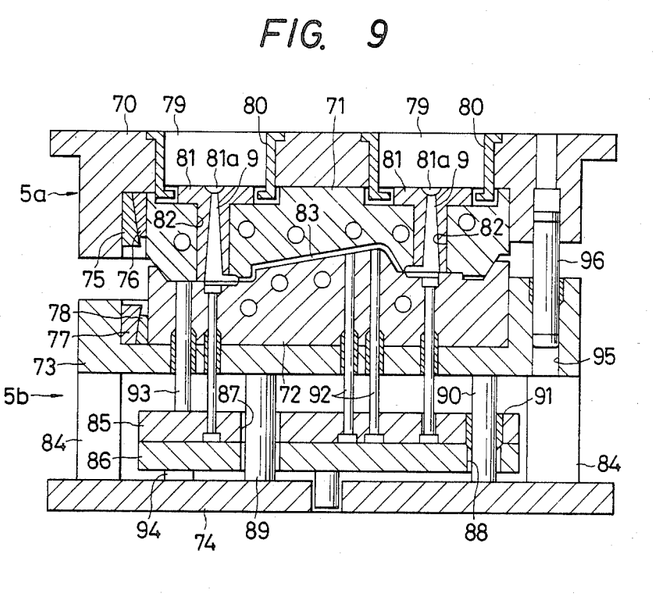
FIG. 9 shows a mold used in the multi-cylinder type injection molding apparatus of the present invention in cross section.
Figure 10:
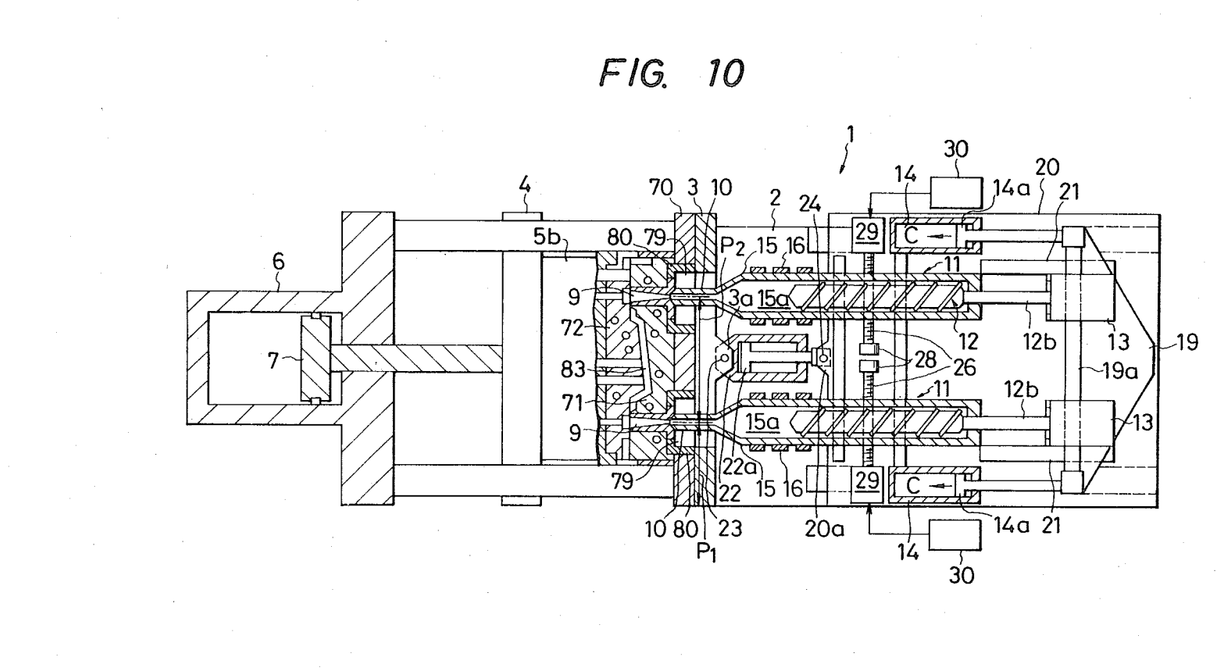
FIG. 10 shows a cross section of the mold of FIG. 9 installed in the first embodiment of the present invention.

In FIGS. 9 and 10, the mold 5 comprises a front cavity 5a composed of a front matrix 70 and a front bush 71, and a rear cavity 5b composed of a rear bush 72, a rear matrix 73, and a base 74.

The front bush 71 is fixed at the depression of the front matrix 70 by wedges 75 and 76. The rear bush 72 is fixed at the depression of the rear matrix 73 by wedges 77 and 78.

The front matrix 78 has two nozzle attachment holes 79. The insides of the nozzle attachment holes 79 are provided with a tapered ring 80.

The front bush 71 is provided with a penetrating hole 82 where a sprue bush 81 is fitted opposite the nozzle attachment hole 79. The sprue bush 81 has on its surface a tapered sprue 9 forming a spherical depression seating surface 81. Between the facing sides of the front bush 71 and the rear bush 73 a cavity 83 is formed, which is charged with resin materials and provides moldings.

Between the rear matrix 73 and the base 74, ejector plates 85 and 86 are arranged via a spacer 84. The ejector plates 85 and 86 are provided with a supporting hole 87 which penetrates both the plates and a plate guide hole 88. A support 89, the ends of which are fixed at the rear matrix 73 and the base 74, and a plate guide pin 90 are inserted into supporting hole 87 and plate guide hole 88, respectively.

In the plate guide hole 88, a guide bush 91 is fitted to provide close attachment to the guide pin 90.

One end of each ejector pin 92 is fixed to the ejector plate 85, which one end of a return pin 93 touches. A stopper pin 94 is fixed on the base 74.

By hydraulically driving the clamping cylinder 6 (see FIG. 10), the rear bush 72 fitted on the rear matrix 73 provides opening and closing operation on the front bush. To smooth the operation during mold opening and closing, a guide pin 96, which slides in the guide hole 95 of the rear matrix 73, is fixed in the first matrix 70.

Such structure of the mold permits the nozzle 10 to enter the nozzle attachment hole of the front matrix, and resin materials to be injected directly from a plurality of sprues into the cavity 83 with the tip of the nozzle 10 closely touching the sprue 9.

Even if a molding is large, the whole cavity 83 is charged with resin materials without incorporating a hot runner or a cold runner, as the runner section is short. The amount of resin materials not becoming a part of the molding is reduced accordingly as the runner section gets short, which enhances the yield rate of materials.

Even though the sprue position of the front bush is varied, the injection cylinder nozzle can be set with ease in accordance with the sprue position, meeting requirements of different moldings.

It will be apparent to those skilled in the art that modifications and variations can be made in the apparatus of this invention. The invention in its broader aspects is, therefore, not limited to the specific details and illustrative examples shown and described. Accordingly, departure can be made from such details without departing from the spirit of applicants' general inventive concept.

What is claimed is:

1. A multi-cylinder type injection molding apparatus, compirising:

a base frame;

a fixed head mounted on said base frame for supporting a molding apparatus having a plurality of sprues, said sprues being in flow communication with a cavity in a mold;

a shifting table movably mounted on said base frame and movable toward and away from said fixed head;

means for moving said shifting table toward and away from said fixed head;

a plurality of longitudinally positioned and laterally aligned injection cylinders mounted on said shifting table and movable therewith, each of said injection cylinders having a first end including a nozzle portion and means for supplying a molten molding material to said nozzle portion, said injection cylinders being movable relative to said shifting table in a positioning direction orthogonal to the direction of movement of said shifting table; and positioning means for moving said injection cylinders in said positioning direction to align each of said injection cylinders with an individual one of said sprues, said nozzle portions of said aligned injection cylinders contacting said sprues when said shifting table is moved toward said fixed head.

2. The apparatus of claim 1, wherein said nozzle portions of said injection cylinders are offset toward each other with respect to the longitudinal axes of said injection cylinders.

3. The apparatus of claim 1, wherein said means for moving said shifting table comprises a hydraulic cylinder.

4. The apparatus of claim 1, wherein said positioning direction is horizontal.

5. The apparatus of claim 1, wherein positioning direction is vertical.

6. The apparatus of claim 1, wherein said positioning means includes control means for detecting the spatial coordinates of said sprues, a ball-and-screw mechanism threadably connected to each of said injection cylinders, and motor means actuated by said control means for rotating said ball-and-screw mechanisms, the rotation of said ball-and-screw mechanism causing said injection cylinders to move in said positioning direction.

7. The apparatus of claim 1, wherein said molding material supplying means includes a hopper portion connected to each of said injection cylinders and a plunger member rotatably and reciprocatably mounted in each of said injection cylinders, said hopper portion being in flow communication with and supplying said molten molding material to the interior of said injection cylinder.

8. The apparatus of claim 7, wherein said molding material supplying means includes plunger actuating means for reciprocating said plunger members within said injection cylinders.

9. The apparatus of claim 8, wherein said plunger actuating means includes a hydraulic cylinder connected between said base frame and each of said plunger members.

10. The apparatus of claim 9, further comprising injection control means for controlling said injection cylinders independently of one another, said injection control means including a hydraulic pump and a servo control mechanism controlling the movement of each of said hydraulic cylinders of said plunger actuating means.

11. The apparatus of claim 7, wherein each of said plunger members includes a spiral groove portion.

12. The apparatus of claim 7, wherein said molding material supplying means further includes means for rotating said plunger members to advance said molding material along said spiral groove portions.

13. The apparatus of claim 12, wherein said plunger member rotating means includes a hydraulic motor connected to each of said plunger members.

14. The apparatus of claim 13, wherein said molding material supplying means further includes plunger actuating means for reciprocating said plunger members within said injection cylinders, said plunger actuating means including a hydraulic cylinder connected between said base frame and each of said hydraulic motors.

15. The apparatus of claim 13, wherein said injection cylinders are substantially parallel to each other, and said molding material supplying means further includes
a rail member slidably mounted on said base frame and supporting said hydraulic motors; and
plunger actuating means for reciprocating said plunger members within said injection cylinders, said plunger members including at least one hydraulic cylinder connected between said base frame and said rail member.

16. The apparatus of claim 13, wherein said injection cylinder includes a joggle portion and each of said hydraulic motors includes a complementary engaging portion, said joggle portions engaging with said engaging portions when said plunger actuating means reciprocates said plunger members toward said nozzle portions.

* * * * *